United States Patent
Andersen

(10) Patent No.: US 11,376,775 B2
(45) Date of Patent: Jul. 5, 2022

(54) EASY CLAMP

(71) Applicant: AMMERAAL BELTECH MODULAR A/S, Vejle (DK)

(72) Inventor: Kenneth Westergaard Andersen, Vejle (DK)

(73) Assignee: AMMERAAL BELTECH MODULAR A/S, Vejle (DK)

( * ) Notice: Subject to any disclaimer, the term of this patent is extended or adjusted under 35 U.S.C. 154(b) by 24 days.

(21) Appl. No.: 16/519,151

(22) Filed: Jul. 23, 2019

(65) Prior Publication Data

US 2020/0023563 A1 Jan. 23, 2020

(30) Foreign Application Priority Data

Jul. 23, 2018 (DK) .............. PA 2018 70499

(51) Int. Cl.
B29C 45/66 (2006.01)

(52) U.S. Cl.
CPC .................. B29C 45/66 (2013.01)

(58) Field of Classification Search
CPC ....... B29C 45/66; B29C 45/1742; B25B 5/10; B25B 1/10
See application file for complete search history.

(56) References Cited

U.S. PATENT DOCUMENTS

| | | | | |
|---|---|---|---|---|
| 5,226,637 A * | 7/1993 | Kitaura | ............. | B25B 1/08 269/234 |
| 6,126,158 A * | 10/2000 | Engibarov | ............. | B25B 5/08 269/101 |
| 2007/0284796 A1 | 12/2007 | Hummel | | |

FOREIGN PATENT DOCUMENTS

| | | |
|---|---|---|
| CN | 106945233 A | 7/2017 |
| EP | 1946903 A1 | 7/2008 |
| EP | 2735419 A1 | 5/2014 |
| JP | S6482914 A | 3/1989 |
| JP | H0229020 A | 1/1990 |
| WO | 2007099763 A1 | 9/2007 |
| WO | WO-2007099763 A1 * | 9/2007 ......... B29C 45/2675 |

OTHER PUBLICATIONS

European Search Report dated Dec. 13, 2019 in European Application No. 19 18 4379, 3 pages.

* cited by examiner

*Primary Examiner* — Joseph S Del Sole
*Assistant Examiner* — Jamel M Nelson
(74) *Attorney, Agent, or Firm* — Berg Hill Greenleaf Ruscitti LLP

(57) ABSTRACT

A clamping device for fastening an injection mold to a tool plate comprises an upper part and a lower part, said lower part having a mounting surface arranged flat against the tool plate. First, second, third and fourth side surfaces upstand from said mounting surface, said upper part having first, second, third and fourth side surfaces. Said upper and lower parts are connected by a first bolt having an axis of symmetry defining an axis. A resilient member is arranged in connection with the first bolt between the upper and lower parts concentrically with the bolt's axis. The first bolt has a non-threaded section such that the lower part or upper part may move along the bolt in the direction of the axis.

10 Claims, 3 Drawing Sheets

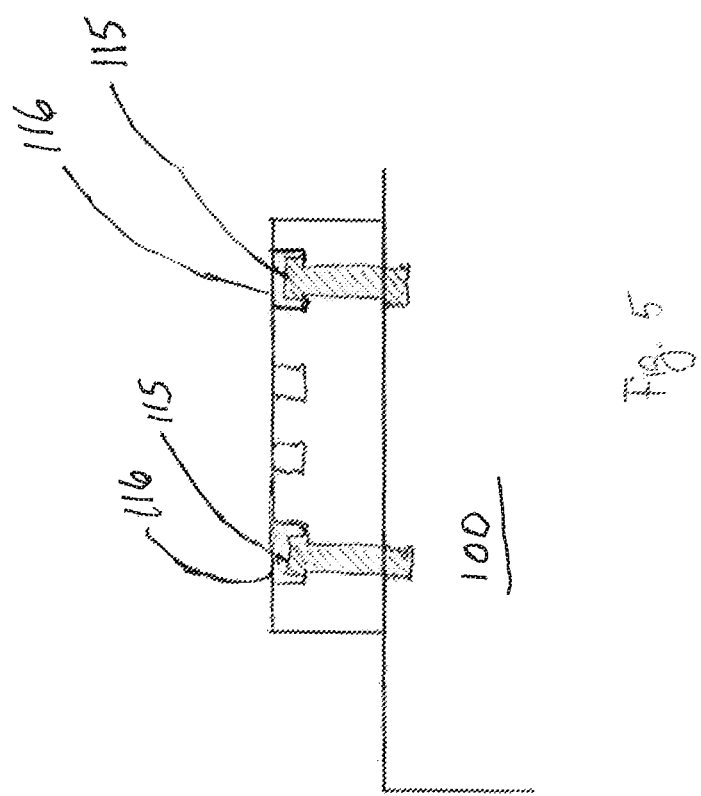

EASY CLAMP

CROSS-REFERENCES TO RELATED APPLICATION

This application claims the benefit of and priority to Danish Patent Application No. PA 2018 70499, filed Jul. 23, 2018. The entire teachings of the above application are incorporated herein by reference.

FIELD OF THE INVENTION

The present invention relates to a clamping device and in particular a clamping device for use in fastening injection molding tools to a tool holding plate in an injection molding machine. Furthermore a method of using the inventive clamping device is also disclosed.

BACKGROUND OF THE INVENTION

In the art of injection molding precision is very important. All tools and machines are manufactured to tolerances down to $1/10$, $1/100$ or even $1/1000$ of a mm. This is necessary in order to be able to manufacture injection molded objects of the required quality.

On the other hand, these very small tolerances may create handling problems for the personnel handling the tools and machinery. Usually the tools and machinery are designed using CAD and manufactured using various computer assisted working processes, such that obtaining the very small tolerances and thereby the high molding quality is normally not a problem. However, for example when exchanging an injection mold with another mold, this process requires manual handling.

Typically the tool holding plate is dismounted from the injection molding machine and brought to the workshop. Here the tool holders are loosened and removed. This usually requires unscrewing a number of bolts. If the tool holders are arranged in cavities in the tool plate, the tool holders will often have to be worked loose. Due to the very small tolerances, and the possibility of dust or other debris becoming engaged between the tool, tool holder and possibly cavity, the tool holder may be stuck, requiring substantial manual effort in order to liberate the tool holder. It requires removal of at least two tool holders as the tools normally have a rectangular shape, in order to be able to remove the mold tool.

Furthermore, as is apparent from the short description above, the accuracy is very important. During injection molding an A form and a B form are squeezed together at high pressure. When the A and B forms are assembled, a cavity corresponding to the desired object to be molded is created. Molten polymer is injected under pressure into this mold cavity. If the A and B forms are slightly off line, i.e. not mounted precisely enough on the respective tool plates, or the part-cavities are not exactly the same size, the quality of the resulting object is not satisfactory. The accumulation of in-accuracies may result in substantial faults in the injection molded objects.

Consequently there is a need for a device or method by which the problems above are addressed and solved.

In the art various attempts have been presented in order to try to provide adequate solutions, until now without any success.

One example is disclosed in JP 56-8238. As far as may be deducted from the illustrations two embodiments are disclosed; a first embodiment illustrated in FIG. 1-3 and a second embodiment illustrated in FIG. 4-6.

With respect to the first embodiment a mold plate 4 is arranged in a cavity, such that the mold plate 4 is forced against two (first) sides 3 arranged at a 90 degree angle of the cavity. On the opposite sides (the two remaining sides) of the mold plate wedges are inserted between the side of the mold plate and the inner side of the cavity, such that by forcing the wedges together, the mold plate is forced against the two other/first sides. In the other embodiment one part of the wedges is inserted in a groove in the mold plate.

In order to mount and de-mount the mold plate it is necessary to place the independent wedges correctly in the mold and then fit and tighten the bolt, thereby forcing the wedges together, and when de-mounting release the bolt and loosen or pry the wedges apart, which may require substantial force. This requires accuracy and manu-manual labor time.

Furthermore, before being assembled and when dismounted, the arrangement comprises a number of separate parts, which the operator needs to assemble correctly in order to achieve the object.

A similar construction is disclosed in JP02-229020.

SUMMARY OF THE INVENTION

To this end the present invention presents a solution which solves the above problems and also provides additional advantages.

The present invention achieves this by providing a clamping device for fastening an injection mold to a tool plate, where the clamping device comprises an upper part and a lower part, said lower part having a mounting surface, suitable to be arranged flat against the tool plate, and first, second, third and fourth side surfaces upstanding from/perpendicular to said mounting surface, said upper part having first, second, third and fourth side surfaces, and where said upper and lower parts are connected by a first bolt, where the bolt's axis of symmetry defines an axis, where a resilient member is arranged in connection with the first bolt between the upper and lower parts, concentric with the bolts axis, and where the first bolt is provided with a non-threaded section such that the lower part or upper part may move along the bolt in the direction of the axis, where the resilient member when unloaded retains a defined distance x between the upper and lower parts, where at least an oblique part of said first side surface of the lower part is arranged at an oblique angle β with respect to the axis, and where at least an oblique part of said first surface of the upper part is arranged with an oblique angle −β, where the oblique part of the first side surface of the lower part is facing the oblique part of first side surface of the upper part, such that the two first side surfaces are parallel and where, when the upper and lower parts are forced together, the lower part's oblique surface and the upper part's oblique surface are displaced in parallel causing the surfaces parallel to the side surfaces of the upper and lower parts to be displaced laterally with respect to the axis.

Particularly the oblique or off-set angles on facing parts which when the upper and lower parts are brought together by tightening of the second bolt(s), as suggested in a further embodiment, which thereby creates a lateral movement due to the relative sliding between the two oblique surfaces, are important.

At least within this application oblique surface shall be understood as surface(s) which are positioned at an angle with respect to all other principal surfaces, such as for example the side surfaces or top and bottom surfaces.

This feature facilitates that the clamping device does not have to be positioned with great precision, as the lateral movement will urge the engagement side of the clamping device into firm contact with the mold. Also when removing the mold, for example with mold changes, simply by allowing the upper and lower parts to move apart along the first bolt, for example as suggested in a further embodiment by loosening the second bolt(s) whereby the resilient member, which also in a further advantageous embodiment is a helical spring, urges the upper and lower parts apart, thereby reducing the lateral displacement, and in consequence releases the clamping device's engagement from the mold.

In a further advantageous embodiment the lower part is provided with one or more through-going apertures, suitable to receive first fastening bolts for fastening the lower part to a tool plate, and one or more threaded holes where the upper part is provided with corresponding apertures to the through-going apertures in the lower part, allowing access to the first bolts for fastening the lower part to the tool plate, and further apertures in the upper part suitable to insert second fastening bolts fitting the thread in the holes in the lower part for forcing the upper part towards the lower part as the bolts are tightened.

As discussed above a bolt interconnects the two separate parts, whereas the two sets of bolts according to this embodiment provides that the lower part may be fastened to the tool plate, independently of the upper part. The second set of bolts foresees that the two parts (upper and lower) may be urged together, thereby creating the lateral movement which fixates the mold relative to the tool plate.

In a still further advantageous embodiment the resilient member is a helical spring arranged coaxially around the first bolt, and where an oversize cavity concentric with the bolt axis, in the upper and/or lower parts, accommodates the helical spring.

This mechanically simple arrangement ensures that as the bolts interconnecting upper and lower parts are loosened the spring will urge the parts apart, thereby making it easy for an operator to remove the clamping device from the tool plate.

Typically the lateral offset between the upper and lower part is between 0.01 mm and 1 mm, preferably between 0.03 mm and 0.7 mm, but most preferred between 0.08 mm and 0.25 mm.

In an embodiment the upper part's side surface opposite to the first surface is offset relative to the corresponding surface of the lower part, where the offset is the distance y, when the clamping device is unloaded, where y is between 1 mm and 10 mm, more preferred 3 mm to 8 mm and most preferred 4 mm to 7 mm.

An intermediate support bloc may in a further embodiment be provided, said support bloc having two opposing faces, where a first face has means to mount the bloc on the tool plate and where an opposite face has means for mounting the clamping device.

The dimensions of the clamping device according to the invention are set out in further advantageous embodiments in the dependent claims. These dimensions foresee easy handling and at the same time provide sufficient relative lateral movement to ensure easy mounting and demounting as well as stable and firm detainment of the mold.

The invention is also directed at a method of using the clamping device as described above and in the claims wherein a tool holding plate suitable to be mounted in an injection molding machine is provided, on which plate injection mold tool holders, positioning two adjacent sides of the injection mold tool are fastened, and where along the remaining sides of the injection mold tool one or more holes are provided on each side for receiving and holding the clamping device's fastening bolts, where after the clamping device is mounted to the tool holding plate the second fastening bolts are tightened, causing the upper part's engagement surface to be offset in parallel relative to the lower part and thereby urge the injection mold tool against the injection mold tool holders, and where the engagement surface firmly engages and holds the injection mold tool.

BRIEF DESCRIPTION OF THE DRAWINGS

The invention will now be explained with reference to the accompanying drawings wherein:

FIG. 5 is a schematic partial cross-section through the intermediate support block 114' mounted on the tool holder 100.

DETAILED DESCRIPTION

Figure 1:
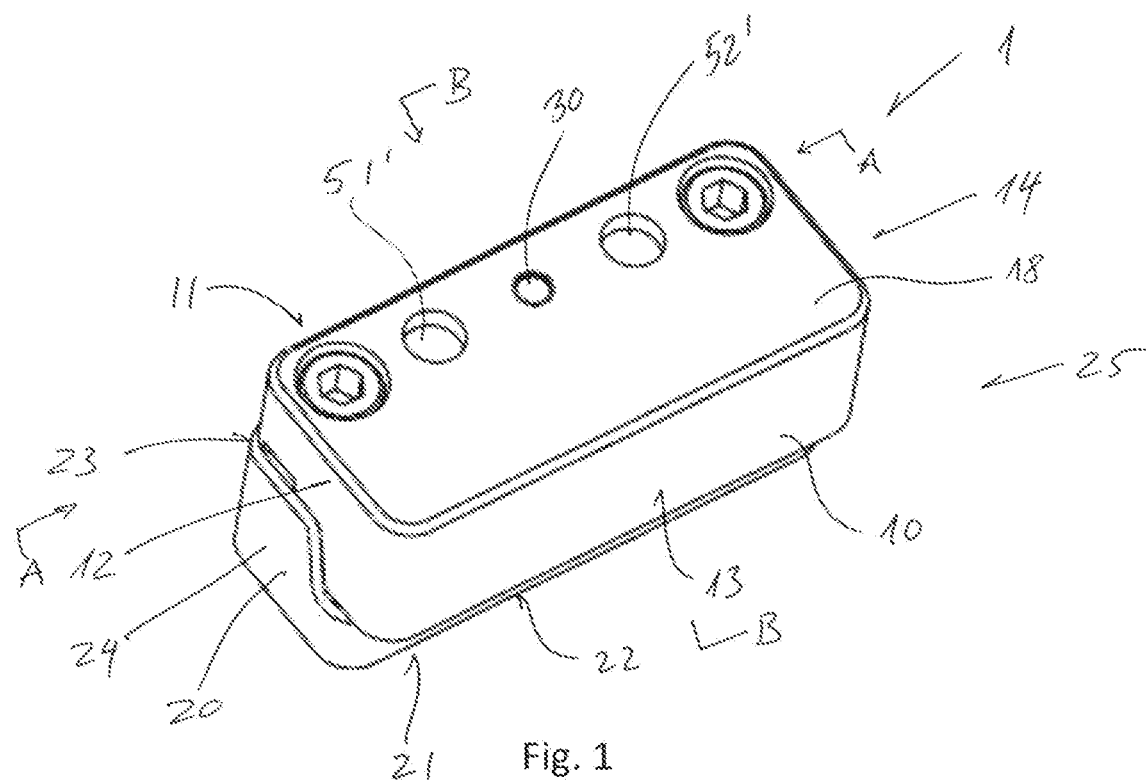
FIG. 1 is a perspective illustration of an embodiment of the clamping device

In FIG. 1 is illustrated a clamping device 1 according to the invention. The clamping device comprises two parts: an upper part 10 and a lower part 20. The lower part 20 is provided with a mounting surface 21 (not visible), suitable to be arranged flat against the tool plate, as will be explained with reference to FIG. 4.

The lower part 20 has first 22, second 23, third 24 and fourth 25 side surfaces upstanding from said mounting surface 21. Likewise the upper part 10 has first 11, second 12, third 13 and fourth 14 side surfaces.

Figure 2:
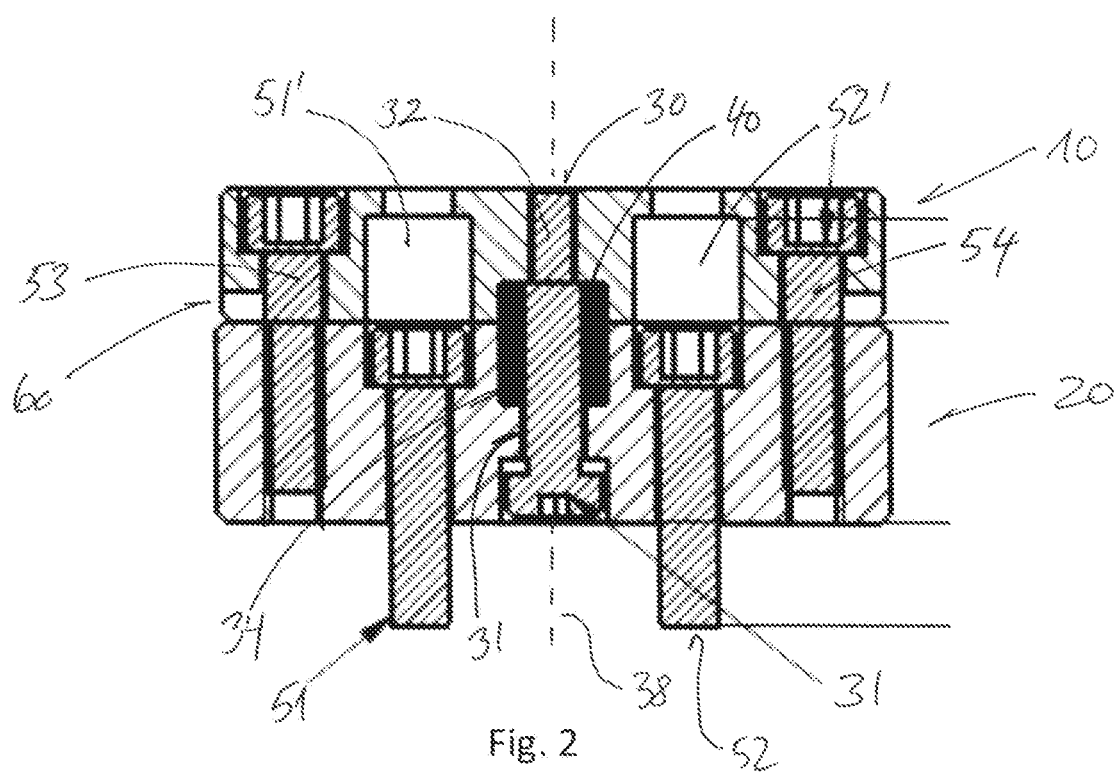
FIG. 2 is a cross-section along A-A in FIG. 1

The upper and lower parts 10, 20 are movably connected by a first bolt 30, where the bolt's axis 38 of symmetry defines an axis, see FIG. 2.

In FIG. 2 a cross-section through a clamping device is illustrated substantially through the cross-section A-A indicated in FIG. 1. The same features are provided with the same reference numbers. In order to urge the upper and lower parts 10, 20 apart a resilient member 40 is arranged in connection with the first bolt 30 between the upper and lower parts 10, 20. The resilient member may be any suitable construction, but in this embodiment a helical spring 40 is arranged concentrically with the bolt's 30 axis 38. In order to allow the upper and lower parts 10, 20 to move relative to each other urged by the resilient member 40 the first bolt 30 is provided with a non-threaded section 31 and a threaded section 32. The threaded section 32 is fastened in the upper part 10, whereas the lower part 20 is provided with a non-threaded section 31. Alternatively the hole 33 may have a diameter such that the interior surface of the hole 33 does not engage the bolt 30. Where the resilient member 40 is arranged around the bolt 30, a cavity 34 is provided, in this example partly in the upper and partly in the lower part 10, 20. In this manner the lower part or upper part 10, 20 may move along the bolt 30 in the direction of the axis 38. The movement is controlled by the bolt, such that the upper and lower parts 10, 20 move along the axis 38 of the bolt, but is also limited by the bolt such that the parts do not separate when used.

In the unloaded stage of the clamping device the resilient member when unloaded retains a distance x (see FIG. 3) between the upper and lower parts 10, 20.

Figure 3:
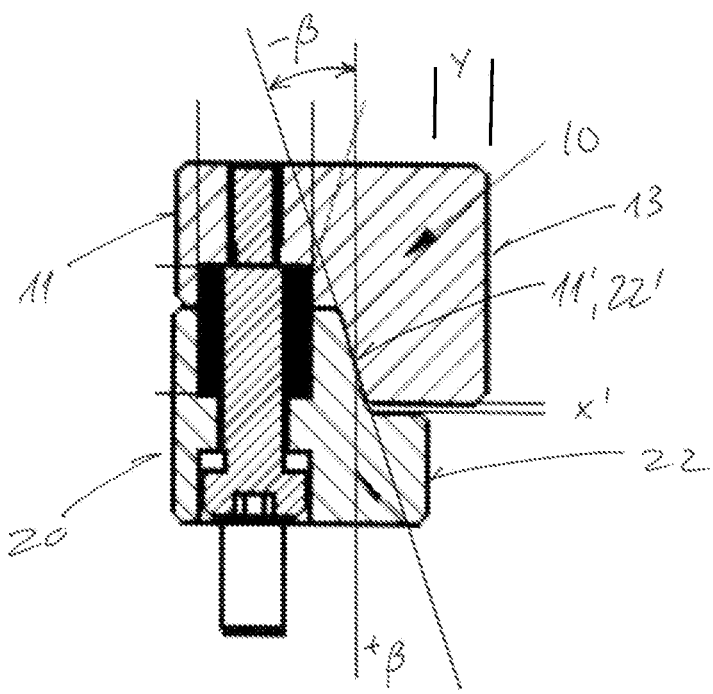
FIG. 3 is a cross section along B-B in FIG. 1

As illustrated in FIG. 3, even when the upper and lower parts 10, 20 are forced together a small distance x' is retained between the upper and lower parts 10, 20. This narrow gap makes it possible to disengage the two parts, should they for some reason have become stuck. Furthermore it also ensured that the relative lateral movement between the upper and lower parts is not hampered by insufficient free space in the direction of the axis 38.

Furthermore the off-set y between the upper part 10 and the lower part 20 is illustrated. Although FIG. 3 illustrates a situation where the upper and lower parts 10, 20 are forced together, the off-set y is indicated for illustrative purposes. It is clear that in the unloaded situation y will be smaller, as the upper part moves (upwards) along the oblique surfaces, thereby causing a lateral movement of the surface 13.

In FIG. 3 is illustrated that at least a part 22', hereinafter referred to as the first oblique surface of said first side surface 22 of the lower part 20, is arranged at an oblique angle $\beta$ with respect to the axis 38, and that at least part 11', hereinafter referred to as the second oblique surface, of said first surface 11 of the upper part 10 is arranged with an oblique angle $-\beta$.

The first and second oblique surfaces 22', 11' are facing each other and are parallel. When the upper and lower parts 10, 20 are forced together, the lower part's oblique surface 22' will urge the upper part's oblique surface 11' to be parallelly offset, in other words a lateral off-set relative to the axis and the plane of the first surface fastening bolts will occur. The distance y increases.

Turning back to FIG. 2 a first set of fastening bolts 51, 52 are provided for fastening the clamping device to a tool plate (not illustrated). Blind bores 51', 52' are provided in the upper part 10, such that it is possible to tighten/loosen the bolts 51, 52 without having to dismantle the clamping device.

A second set of fastening bolts 53, 54 is provided. When tightening these bolts 53, 54 the upper part 10 is forced towards the lower part 20. As the parts 10, 20 engage this will occur as a sliding movement between the oblique surfaces 11', 22'. Due to the oblique angle $\beta$, lateral displacement (relative to the axis 38) of the upper and lower parts 10, 20 will occur. As the lower part by means of the bolts 51, 52 is fastened to the tool plate the side surface 13 of the upper part 10 will be laterally displaced, and thereby engage the mold (not illustrated).

In use the second set of fastening bolts 53, 54 will only be loosened slightly—just enough for the side surface 13 to disengage from the mold. If the second set of fastening bolts is removed altogether, the upper and lower parts 10, 20 will still be held together by the bolt 30.

With this construction, as is evident from FIG. 1, all bolts which it is necessary to access during use of the device are accessible from the top surface 18 of the upper part 10.

In order to further assist in the loosening of the two parts 10, 20 a slot 60 is provided, such that a tool, for example a screw driver may be used to pry the two parts 10, 20 apart. When the clamping device has been fastened and firmly held the mold for maybe 10,000 or more cycles, the parts will have a tendency to "grow" together, such that extra force may help disengagement.

Figure 4:
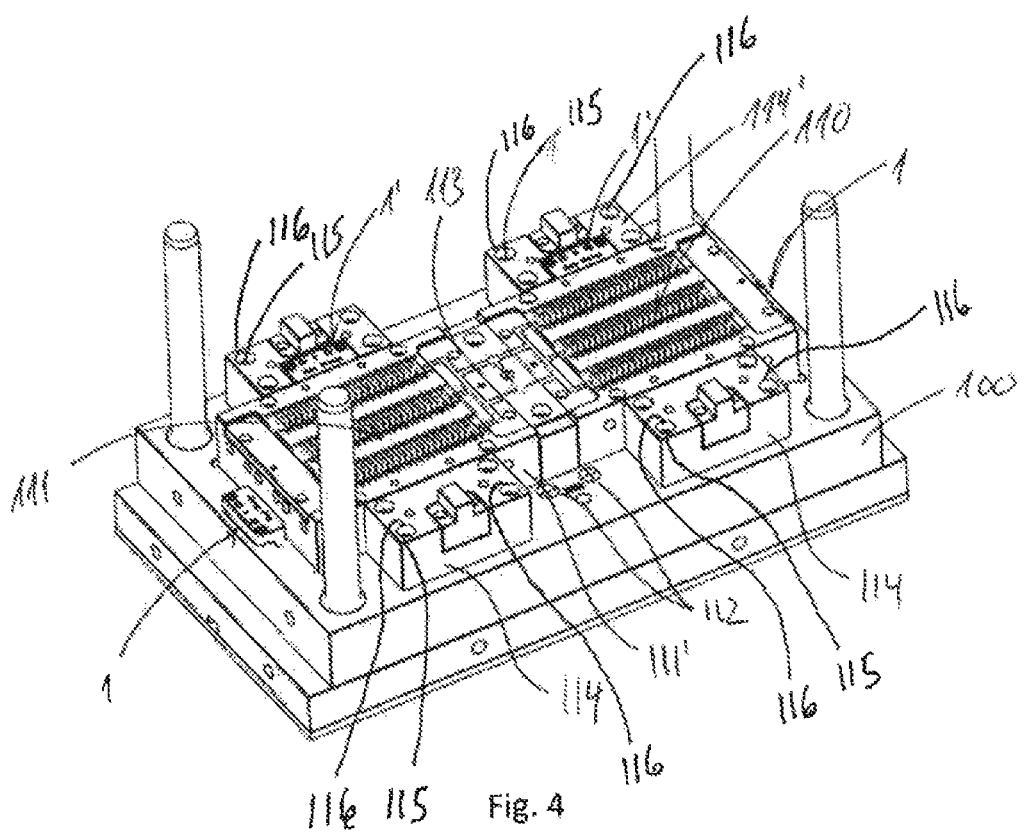
FIG. 4 is a perspective illustration of a tool plate with a mounted mold

Turning to FIG. 4 an assembly is illustrated. On a tool holding plate 100 two half-molds 110, 111 are arranged. In the illustrated embodiment the molds each have three cavities, suitable to mold three objects each per cycle.

On the tool plate are provided permanent "0" positions 112. Between the two molds is a polymer distribution block 113. This is where the runner will form. Along one side of the molds 110, 111 are provided fixed side limit-blocks, also referred to as molding tool holders 114. Together with the distribution block 113, they fix a corner 111' correctly with respect to the "0" position 112.

In order to fixate the mold 110, 111 in the correct position, clamping devices 1, 1' are arranged along the two free sides of each mold 110, 111. For illustrative purposes the clamping devices 1' are arranged in intermediate support blocks 114'.

The clamping devices 1,1' may be arranged in cavities (not illustrated) cut in the tool holding plate 100, where the threaded holes for receiving the bolts 51, 52 is provided in the bottom of the cavity.

When preparing a tool plate for mounting in the injection molding machine the molds 110, 111 are positioned abutting the tool holders 114 and the block 113. The clamping devices 1, 1' are by means of the first fastening bolts 51, 52 fastened on the tool holding plate 100. Secondly the second set of fastening bolts 53, 54 are then tightened whereby the lateral displacement of the upper part 10 of the clamping device is effected. This lateral displacement forces the mold into firm engagement with the holder 114 and block 113, such that the mold is precisely positioned and securely held on the tool holding plate 100.

When the molds 110, 111, have to be released and removed, the second set of fastening bolts 53, 54 is unscrewed at least partly. The resilient member, maybe aided by the screw driver prying in the slot 60, urges the upper and lower parts 10, 20 apart, such that the upper part 10 is laterally pushed away from the mold, which thereafter is loose and can easily be removed.

FIG. 5 is a schematic partial cross-section through the intermediate support block 114' mounted on the tool holder 100. The mounting means are in the shape of bolts 115. Also illustrated are the holes 116 that are designed to receive the bolts 115 which mount the clamping device 1 to the intermediate support block 114'.

The invention claimed is:

1. A clamping device for fastening an injection mold to a tool plate comprising:
    an upper part and a lower part, said lower part having a mounting surface, suitable to be arranged flat against the tool plate, and first, second, third and fourth side surfaces perpendicular to said mounting surface:
    said upper part having first, second, third and fourth side surfaces, and where said upper and lower parts are connected by a first bolt;
    where the first bolt has an axis of symmetry defining an axis;
    where a resilient member is arranged in connection with the first bolt between the upper and lower parts, concentrically with the first bolt's axis, and where the first bolt is provided with a non-threaded section such that the lower part or upper part may move along the first bolt in the direction of the axis;
    where the resilient member when unloaded retains a defined distance between the upper and lower parts;
    where at least an oblique part of said first side surface of the lower part is arranged at an oblique angle $\beta$ with respect to the axis, and where at least an oblique part of said first surface of the upper part is arranged with an oblique angle $-\beta$;

where the oblique part of the first side surface of the lower part is facing the oblique part of first side surface of the upper part such that the two first side surfaces are parallel;

where, when the upper and lower parts are forced together the lower part's oblique surface and the upper part's oblique surface are displaced in parallel causing the surfaces parallel to the first side surfaces of the upper and lower parts to be displaced laterally with respect to the axis; and wherein the upper part's side surface opposite to the first surface is offset relative to the corresponding surface of the lower part, where the offset is the distance y, when the clamping device is unloaded, where y is between 1 mm and 10 mm.

2. The clamping device according to claim 1, wherein: the lower part is provided with one or more through-going apertures, suitable to receive first fastening bolts for fastening the lower part to said tool plate, and one or more threaded holes where the upper part is provided with corresponding apertures to the through-going apertures in the lower part, allowing access to the first fastening bolts for fastening the lower part to the tool plate, and further apertures in the upper part suitable to insert second fastening bolts fitting the thread in the holes in the lower part for forcing the upper part towards the lower part as second fastening bolts are tightened.

3. The clamping device according to claim 1, wherein: the resilient member is a helical spring arranged coaxially around the first bolt, and where an oversize cavity concentric with the first bolt's axis, in the upper and/or lower parts, accommodates the helical spring.

4. The clamping device according to claim 1, wherein: a lateral offset between the upper and lower part is between 0.01 mm and 1 mm.

5. The clamping device according to claim 1, wherein: an intermediate support block is provided, said support block having two opposing faces, where a first face has means in the shape of bolts to mount the block on the tool plate and where an opposite face has means for mounting the clamping device in the shape of threaded holes for receiving the bolts.

6. The clamping device according to claim 1, where a lateral offset between the upper and lower part is between 0.03 mm and 0.7 mm.

7. The clamping device according to claim 1, where a lateral offset between the upper and lower part is between 0.08 mm and 0.25 mm.

8. The clamping device according to claim 1 where a side surface opposite to the first surface of the upper part is offset relative to a corresponding surface of the lower part, where the offset is the distance y, when the clamping device is unloaded, where y is between 1 mm and 10 mm.

9. The clamping device according to claim 1 where a side surface opposite to the first surface of the upper part is offset relative to a corresponding surface of the lower part, where the offset is the distance y, when the clamping device is unloaded, where y is between 3 mm to 8 mm.

10. The clamping device according to claim 1 where a side surface opposite to the first surface the upper part is offset relative to a corresponding surface of the lower part, where the offset is the distance y, when the clamping device is unloaded, where y is between 4 mm to 7 mm.

\* \* \* \* \*